Aug. 31, 1937.  H. A. DOUGLAS  2,091,470
SWITCHING MECHANISM
Original Filed Aug. 21, 1933  2 Sheets-Sheet 1
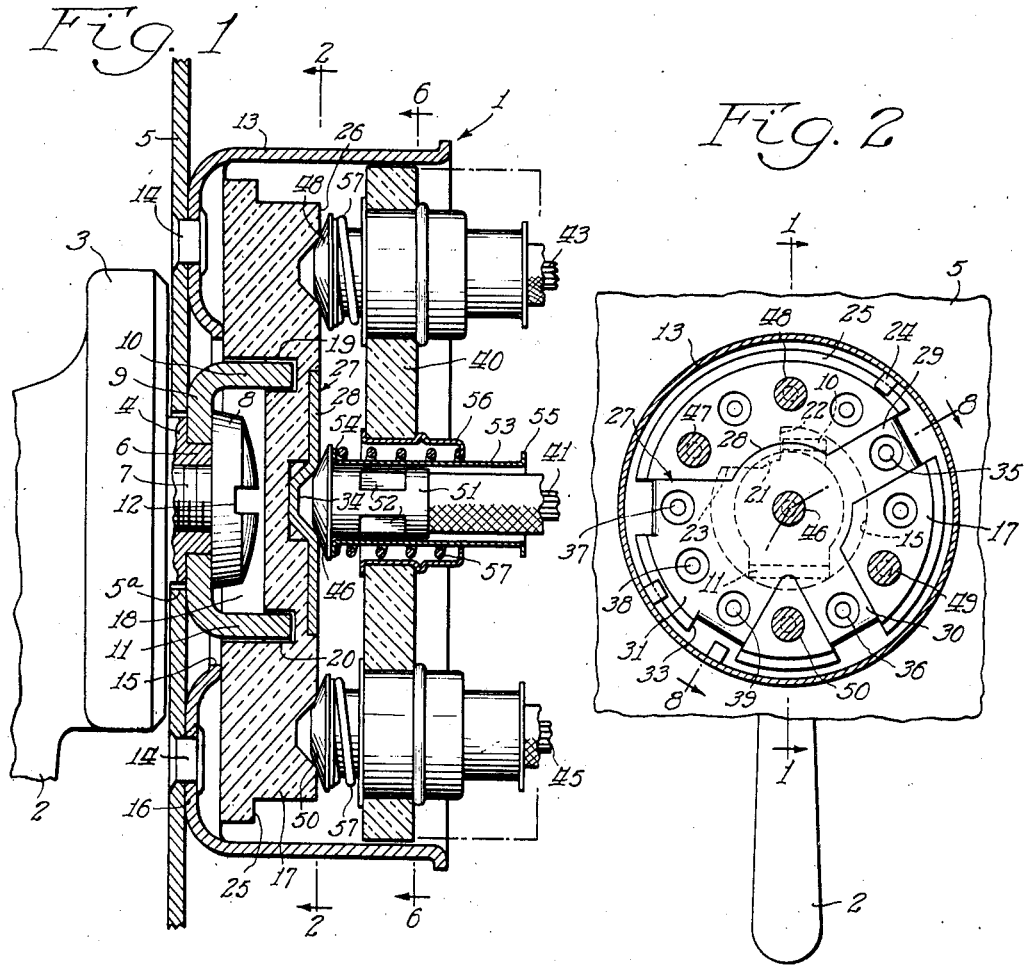
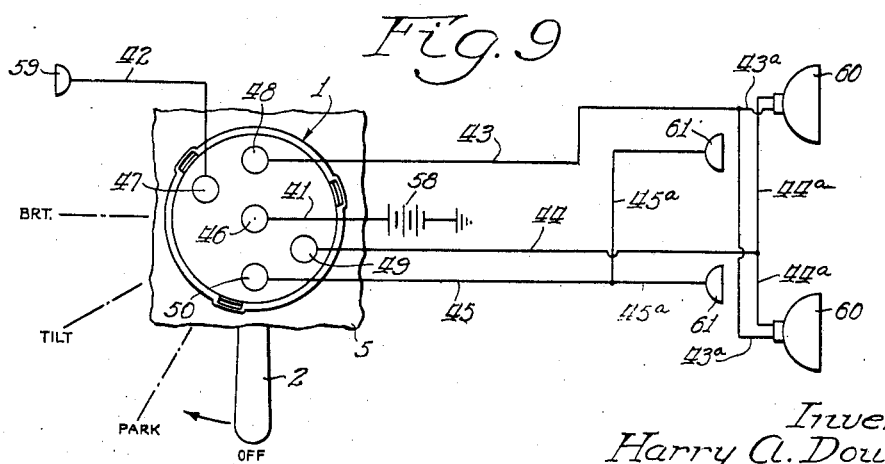
Inventor
Harry A. Douglas
By: Langan Moon
Atty.

Aug. 31, 1937.    H. A. DOUGLAS    2,091,470
SWITCHING MECHANISM
Original Filed Aug. 21, 1933    2 Sheets-Sheet 2

Inventor
Harry A. Douglas
By: Langdon Moore
Atty.

Patented Aug. 31, 1937

2,091,470

UNITED STATES PATENT OFFICE 2,091,470

SWITCHING MECHANISM

Harry A. Douglas, Bronson, Mich., assignor to Kingston Products Corporation, a corporation of Indiana Application August 21, 1933, Serial No. 686,014
Renewed April 1, 1936

7 Claims. (Cl. 200—11)

This invention relates to switching mechanism or the like for electric circuit continuing devices and the invention is adapted more particularly for automotive vehicle equipment.

Among other objects, the invention aims to provide mechanism, together with parts therefor, which may be readily assembled, which is simple in construction and operation, and which, at the same time, is positive in operation and durable in performance.

Other objects and advantages will be apparent from the following description, taken together with the accompanying drawings showing an illustrative embodiment of the invention.

In the drawings—

Figure 1 is an axial section of the illustrative mechanism and parts therefor in assembly;

Figure 2 is a cross-section, on a reduced scale, taken on the line 2—2 of Figure 1, and showing the "off" position of the mechanism;

Figure 9 is a circuit diagram illustrating illustrative circuits for an automotive vehicle with which my invention may be employed.

Figure 3:
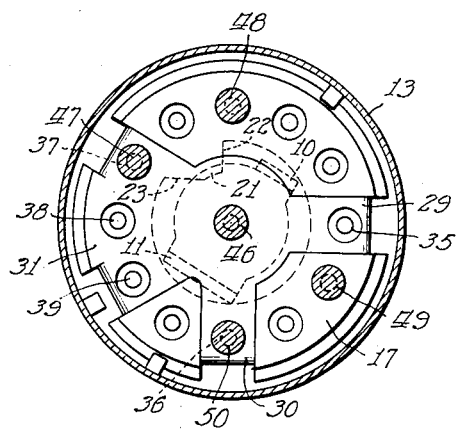
Figure 3 is a view similar to Figure 2, with certain parts omitted, and showing one of the circuit continuing positions of the mechanism.

The illustrative switching mechanism 1 may be conveniently operated by a handle 2 having a hub 3. The hub may have a reduced portion 4, which in this instance is journaled in a circular opening 5a in the panel 5 representing, for example, a fragment of an instrument panel of the motor vehicle. The reduced portion 4 of the handle may further be reduced as at 6 and these portions may threadedly receive the retaining screw 7 having a head 8 between which head and the portion 4 is clamped an actuator 9. The actuator 9, in this instance metallic, has axially directed fingers 10 and 11 directed away from the rear of the panel 5. The actuator 9 is shown of larger diameter than the reduced portion 4, and the handle is thus located in axial position in its bearing in the panel 5 by having the margins of the opening 5a of the panel located between the actuator 9 and the hub 3. The head 8 of the retaining screw may be grooved as at 12, so that it may be turned by a screw-driver.

The switching mechanism 1 also includes the metallic cylindrical cup-shape casing 13 which is here shown secured to the panel 5 as by the rivets 14, so that an aperture 15 in its radially extending wall 16 is concentric with the opening 5a in the panel 5.

Figure 4:
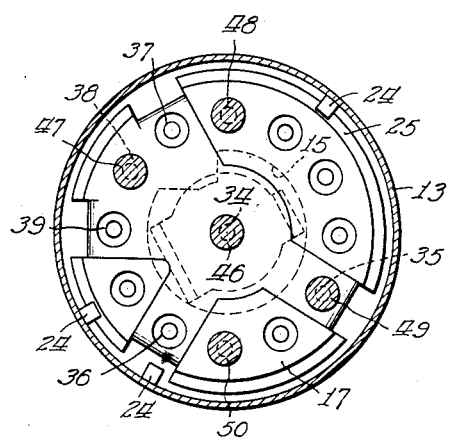
Figure 4 is a view similar to Figure 3, and showing another operative position.
Figure 5:
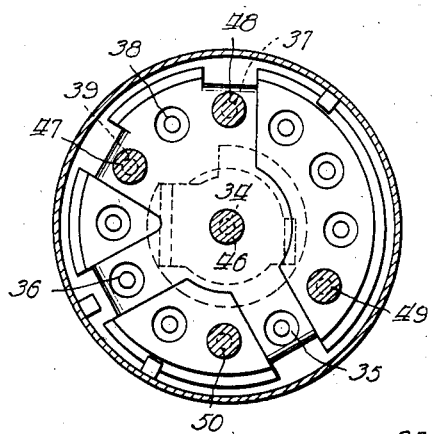
Figure 5 is a view similar to Figures 3 and 4 and showing still another operative position.

A disc 17 of insulating material such as phenolic condensation product is received in the casing 13, in this instance in abutment with the wall 16 in the casing and this disc is centrally recessed as at 18 to receive the head 8 of the screw. The recess 18 in the disc is extended axially at two spaced apart places 19 and 20 to receive the actuator extensions 10 and 11, whereby the disc 17 is keyed to rotate with the handle 2. One of these extensions, such as the extension 10 and its corresponding recess in the disc may be narrower than the other extension 11 and its corresponding recess, so that the disc and actuator may be assembled in only one position. The aperture 15 in the casing is generally circular but is advantageously interrupted by an inwardly extended portion 21 in the margin thereof, as best shown in Figures 2 to 5, inclusive, thus forming stops 22 and 23 limiting rotation of the handle and disc 17, the stop 22 engaging the actuator extension 10 in one extreme position of the parts as shown in Figure 2, and the stop 23 engaging the actuator extension 11 in the other extreme position of the parts as shown in Figure 5.

Figures 7, 8:
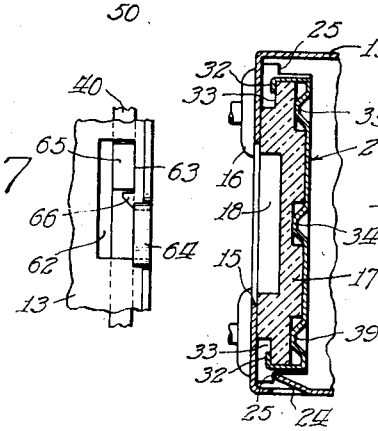
Figure 7 is a partial side elevation of parts taken on the line 7—7 of Figure 6.
Figure 8 is a partial axial section similar to Figure 1 on a reduced scale.

To retain the disc 17 in the casing after it has been inserted therein in proper position, inwardly struck tongues 24, as best shown in Figure 8, engage an annular shoulder 25 provided on the periphery of the disc facing rearwardly thereof.

Upon its rear face 26 the disc 17 has affixed a metallic current conducting bridge 27. As shown in Figures 2 to 5, this bridge comprises a flat plate of irregular formation having a central portion 28 and integral segmental portions 29, 30 and 31 spaced apart in the vicinity of the periphery of the disc. The bridge 27 may be set into the face 26 of the disc 17 to be flush therewith and may be permanently assembled with the disc by having ears 32 bent back over the disc and clinched in peripheral notches 33, as best shown in Figure 8. The bridge 27 terminates short of the shoulder 25 of the disc, so as not to interfere with the retaining tongues 24.

It will be noted that the central portion 28 of the bridge and corresponding portion of the disc in the vicinity thereof is depressed to form a shallow depression 34 and about this depression are produced in the rear face 26 of the disc including the segmental portions of the bridge, a number of regularly spaced apart circumferentially arranged recesses similar to the depression 34.

The segmental portions 29 and 30 of the bridge 27 are of equal size and each include one of the circumferential depressions 35 and 36, respectively. The bridge segment 31, however, covers a larger arc of the disc 17 and includes three of the circumferential depressions 37, 38 and 39, for a purpose presently explained.

The contacts with which the rotatable bridge 27 is adapted to engage are carried by a contact carrier in the form of a second disc 40 also of insulating material desirably comprising phenolic condensation product. The disc 40 is secured in the rear or open end of the casing 13 and may form a closure therefor. Insulated conductors, such as the wires 41, 42, 43, 44 and 45 are brought through the disc 40 and terminate within the casing in contacts 46, 47, 48, 49 and 50, respectively. The conductor 41 and its corresponding contact 46 are arranged coaxially of the casing and discs 17 and 40, so that the contact 46 and central depression 34 in the bridge 27 are in registry. The other conductors and their corresponding contacts are disposed circumferentially about the conductor 41 concentrically with the circumferential depressions in the disc 17 and bridge 27, so that these latter contacts and depressions may be selectively placed in registry by rotation of the disc 17.

The conductors may be advantageously secured to the reduced shanks 51 of the contacts as for example by swedging at 52 (Figure 1) and the shank of a contact together with its corresponding conductor may be passed rearwardly through a metallic sleeve 53 having annular shoulders 54 and 55 at each end. The sleeve 53, as shown in Figure 1, has limited movement in the hollow metallic bushing 56 which is fixedly secured in the disc 40. A coil spring 57 is bottomed in the bushing 56 and compressed between the bushing and the forward shoulder 54 of the sleeve 53, which shoulder abuts the head of the contact. This structure just described is more specifically described and is claimed in my copending application, Serial No. 644,281, filed November 25, 1932.

So constructed and arranged each contact is urged forwardly into its corresponding depression in the disc 17 and the circumferential contacts ride in and out of the circumferential depressions upon rotation of the disc 17, moving into the depressions with a snap action under the influence of the springs 57 to yieldingly determine the respective rotative positions of the disc 17. The contact 46 is, of course, continuously pressed into the recess 34 and merely rotates therein in continuous engagement with the bridge 27. The central contact 46, by its conductor 41, is connected with the battery 58 grounded to the frame of the vehicle in the illustrative diagram of Figure 9. The contact 47, by its conductor 42, is connected with a grounded filament (not shown) of the tail light 59. The contact 48, by its conductor 43 and branch conductors 43a, is connected with one of the pairs of filaments, for example, the grounded filaments known as the "bright" filaments (not shown) of the headlights 60. The contact 49, by its conductor 44 and branch conductors 44a, is connected with the other grounded filaments, known as the "tilt" filaments (not shown) of the headlights 60. The contact 50, by its conductor 45 and branch conductors 45a, is connected with the grounded filaments (not shown) of the parking lights 61.

When the switching mechanism is in the "off" position shown in Figure 2, all of the contacts except the central contact 46 are out of engagement with the bridge 27 and are in direct engagement with the depressions in the insulating face of the disc 17. Thus no circuit is continued through the bridge or through the circumferential contacts. When the operating handle 2 is moved to place the mechanism in the first circuit continuing position shown in Figure 3, the bridge 27 engages not only the central contact 46, but also the contacts 47 and 50, the segmental portion 30 of the bridge engaging the contact 50 which is received in the depression 36 of this segment, and the segmental portion 31 engaging the contact 47, this contact being received in the depression 37 of this segment. Thus the tail light 59 and the parking lights 61 are energized. In the next rotative position shown in Figure 4 the segmental portion 29 of the bridge moves into engagement with the contact 49, this contact being received in the depression 35 of this segment, energizing the "tilt" filaments of the headlights, while at the same time the segmental portion 31 of the bridge is still in engagement with the contact 47 for the tail-light, this latter contact having of course been received into the next succeeding depression 38 in the segmental portion 31 of the bridge. At this time the segmental portion 30 of the bridge is out of engagement with any of the circumferential contacts, as shown in Figure 4. In the next rotative position of the parts as shown in Figure 5, both the segmental portions 29 and 30 of the bridge are out of engagement with any of the circumferential contacts, while the segmental portion 31 is in engagement with both the contacts 47 and 48, the contact 47 being received in the depression 39 in this segmental portion of the bridge and the contact 48 being received in the depression 37. Thus the tail light 59 and "bright" filaments of the headlights are energized.

Figure 6:
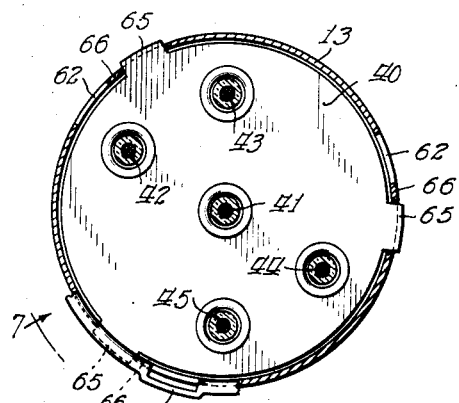
Figure 6 is a cross-section, on a reduced scale, taken on the line 6—6 of Figure 1.

I have not yet explained how the disc 40 is retained in the casing 13, but will now do so. In accordance with my invention, the rear end of the casing is provided with bayonet slots 62, desirably a trinity thereof, substantially equally spaced apart about the axis of the casing; in this instance, the space between the slots 62 on the left side of the circle in Figure 6 is somewhat less than the space between these slots and the slot on the right side of the circle, and, as shown, each slot has a seat 63 at its inner end. At the outer ends of the slots, integral portions 64 of the casing 13 desirably span the slots, as best shown in Figures 6 and 7, so as to strengthen and prevent distortion of the casing at these points. The disc 40 is correspondingly provided with a trinity of bayonet fingers 65, which are arranged to pass through the slots 62 under the portions 64 which are bulged outwardly slightly, and by a turning movement of the disc, to be snugly received in the seat 63. So constructed and arranged, it will be apparent that the disc 40 is moved into the casing against the force of the springs 57 which, when the disc has been so turned, press the bayonet fingers 65 into their seats 63, each seat having a sharp shoulder 66 between it and the outer portion of the slot 62, so that the disc 40 is securely but yieldingly retained in the casing against any substantial rotative or axial movement.

The contacts and the depressions receiving them are desirably of conical or tapered formation to facilitate engagement and disengagement as described.

I have therefore disclosed a novel arrangement of two floating discs, relatively rotatable, each disc serving to maintain the other in position through resilient means, which means also serves to provide a good electrical contact and to determine the respective positions of the discs. When I say that each disc maintains the other in position, I am not unmindful of the fact that I have referred to the tongues 24 which may engage the annular shoulder 25 on the disc 17 to maintain the disc 17 in position, but this latter arrangement is principally of service when the disc 40 is removed from the casing for installation or repair, and is not essential to the assembled mechanism.

Figure 10:
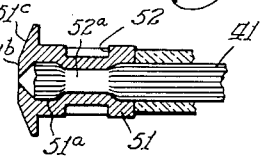
Figure 10 is an axial section illustrating the manner in which the contacts are secured to the conductors.

I have also disclosed a novel arrangement by mounting the ends of the conductors to be yieldingly held against the bridge 27 and to ride in and out of engagement therewith upon rotation of the disc 17, while at other times to be yieldingly held against the rear face 26 of the disc 17. As heretofore said, the insulated conductors such as the wires 41, 42, 43, 44 and 45 terminate in contacts 46, 47, 48, 49 and 50. As shown in Figure 10 each of these contacts forms an integral end or termination of the wires of each of the conductors. The shank 51 of the contact is provided with an axial bore 51a adapted to receive the wires 41 of the conductor. The bore terminates in a conical closure in the head which may open axially of the flat outer surface 51b which surface is tapered circumferentially to form a conical surface 51c for ease in riding in and out of engagement with the depressions in the bridge 27 and face 26 of the disc 17. After the wires of conductors are inserted in the bore 51a, the walls of the shank 51 are indented at least in three places, as shown at 52, with such force and to such an extent as to cause the metal of the wires of the conductor to flow into an integral mass 52a to practically form a fused metal-to-metal connection between the wires and the metal of the contact, in the manner described in my copending application, Serial No. 602,916, filed April 4, 1932.

Obviously, the invention is not limited to the details of construction described. Furthermore, it is not essential that all features of the invention be used conjointly, since various combinations and sub-combinations may be advantageously employed.

Having described my invention, I claim:

1. An electric switch including a casing, a disc of insulating material mounted for rotation and arranged for axial movement in one direction therein, means adapted to engage and impart a rotative movement thereto, a second disc mounted for rotation and arranged for axial movement in both directions therein, a plurality of continuous electrical conductors passing through the second disc at right angles thereto and having integral enlarged heads upon the inner side thereof adapted to engage the first disc, resilient means between the respective heads of the continuous conductors and the said second disc, means locking the said second disc against radial and axial movement held in locked position by the said resilient means, and a current continuing bridge mounted upon the first disc adapted upon rotation to selectively bridge selected conductors.

2. The structure of claim 1 wherein the enlarged heads are swedged upon the ends of the conductor wires and the said resilient means includes springs coiled about the respective conductors bearing against the enlarged head thereon and anchored upon the said second disc whereby the said heads are maintained in sliding engagement with the first disc and the second disc is forced away therefrom into locked position.

3. An electric switch, comprising: a support; a first element, mounted for rotation with respect to said support; a second element, held against rotation with respect to said support, said second element being shiftable with respect to said support in a direction transverse to the axis of rotation of said first member; and interengaging means, in part carried by said first element, and in part carried by said second element, said interengaging means being so constructed and arranged to maintain said first and second elements in alignment for proper relative rotational movement.

4. An electric switch, comprising: a casing; a rotatable switch member, insertable to predetermined operative position within said casing; means constructed and arranged to limit such inserting movement; and means, formed on said casing, and constructed and arranged to permit rotational movement of said switch member, but to limit withdrawal movement of said switch member from said casing.

5. An electric switch, comprising: a casing; a rotatable switch member disposed within said casing; one surface of said member bearing against a wall of said casing, and said casing having struck-in tongues engaging the other surface of said member, said tongues being constructed and arranged to permit rotation but limit axial movement of said switch member.

6. An electric switch, comprising: a base, having an aperture; a cup-shaped member, having a portion disposed in said aperture, the closure wall of said member having an aperture of a size smaller than said base aperture; sleeve means, mounted for reciprocable movement through said member aperture, said sleeve means having spaced shoulders; a body, having an electrical contact surface, disposed within said sleeve means, and having an abutment engaging one of said spaced shoulders; resilient means, interposed between said one shoulder and the closure wall of said member, for urging said body and said sleeve means in one direction away from said body; the other of said spaced shoulders being engageable with the closure wall of said member to limit movement in said one direction.

7. An electric switch, comprising: a base, having an aperture; a body, having an electrical contact surface, mounted in said aperture for reciprocatory movement, and having an abutment; sleeve means, disposed about said body, and having spaced shoulders, one of said shoulders abutting the abutment on said body; resilient means, engaging said one shoulder, and constructed and arranged to urge said one shoulder and said body abutment in a direction away from said support; said other shoulder being constructed and arranged to limit movement of said sleeve means in said direction.

HARRY A. DOUGLAS.